Patented Mar. 15, 1927.

1,621,117

UNITED STATES PATENT OFFICE.

WINFORD P. LARSON, OF MINNEAPOLIS, MINNESOTA.

MODIFIED PNEUMOCOCCIC ANTIGEN, ANTIPNEUMOCOCCIC SERUM, AND PROCESS OF PRODUCING THE SAME.

No Drawing. Application filed August 27, 1925, Serial No. 52,964. Renewed January 7, 1927.

It is the object of my invention to produce a modified pneumococcic antigen, an antipneumococcic serum, and especially an antitoxic serum, which are effective in the prevention and treatment of pneumococcic infection.

My invention comprises both the antipneumococcic serum, specifically the antitoxic pneumococcic serum, and the process of producing it; as well as the modified pneumococcic antigen.

In preparing an anti-toxic pneumococcic serum in accordance with my process, I first attenuate the pneumonia organisms (pneumococci) or the products or toxins thereof or both, by treating them with a soluble salt of an organic acid which is a surface tension depressant, which reduces their virulence while leaving them antigenic; inject this attenuated substance into an animal; and later obtain serum (by which term I include injectable material even though the first fractionation of the blood was to produce plasma) from the blood of such animal.

The treatment of the pneumococci is desirably sufficient to reduce their virulence to a point where a dose as large as a plurality of normal lethal doses may be injected into an animal without killing it, while leaving said pneumococci sufficiently antigenic to incite the production of pneumonia antibodies in the injected animal.

The pneumococci, obtained in any convenient manner, or the products or toxin thereof, or both, are attenuated or detoxified by treating them with a soluble salt of one of the higher fatty acids, which salts are commonly designated as soaps and are all surface-tension depressants, (or capillary active substances, the two terms being synonymous,) or with a soluble salt of some other organic acid which is a surface-tension depressant. The salts I prefer to employ are derived from fatty acids having melting points below 44° C. and are soluble in water at that or a lower temperature. Of these, I prefer the salts derived from unsaturated fatty acids, particularly those having one or more hydroxyl groups, such as a soluble salt of ricinoleic acid, and especially purified castor oil soap. I prefer to work with the castor oil soap solution at a pH of 7.4 to 8.0, within which pH range the desired attenuating effect is at a maximum.

The concentration of the castor oil soap solution after mixture therewith of the pneumococci may vary considerably. My experience shows that it should be between 0.1% and 20%, and is desirably about 1% to 3%. The surface-tension depressant renders the pneumococci and the toxin produced thereby sufficiently non-poisonous so that many times the normal lethal dose of the pneumococci may be injected into an animal without producing death. Yet the treated pneumococci or the toxin produced thereby retain sufficient stimulating power to serve as antigens, so that they incite in the inoculated animal a production of pneumonia anti-toxin. This anti-toxin is apparently effective as against the toxin of the pneumococci of all types, and appears to be the same regardless of the type of pneumococci used as antigens.

Thus the pneumococci, and/or the products or toxins thereof, when treated in accordance with my invention, may be used as antigens to produce active immunity against pneumococcic injections.

The action of the attenuated or detoxified pneumococci in the animal body is due to an absorption of the fatty-acid salt on the pneumococci or on the toxin molecules, or on both, so that upon the injection the antigen is at first partially or entirely restrained from exerting its poisonous action, which would otherwise cause the death of the animal. My experience indicates that following the injection such antigen is slowly released from this absorbed fatty-acid salt, so that the antigen has its effect spread out over a relatively longer period of time instead of being suddenly effective, and the resultant longer-continued stimulation of the animal body causes the latter to build up resistance by rapidly creating anti-toxin.

My experience also furnishes evidence that the fatty-acid salt, perhaps by its capacity to dialyze, promotes penetration of the antigen (toxin or bacterial organism or both) mixed with it into the body tissues, so that such antigen is more widely distributed through the body and thus exerts its antigenic or stimulatory action over a wider area, with a maintenance of the stimulating effect per unit of area below a critical maximum beyond which ill effects and a less proportionate production of anti-toxin occur, and with a greater and more rapid total production of anti-toxin because of the increase in area of the stimulation.

I have found rabbits convenient animals to use for producing the anti-toxin. However, larger animals, such as sheep, are also used with success, especially in large-scale production. The attenuated or detoxified pneumococci, or their products or toxins or both after being treated as above described, are suitably injected into the animal, as by subcutaneous, intraperitoneal, or intravenous injection. There may be several injections at intervals if desired, with gradually increasing doses; and I have found that five injections at intervals of about twenty-four hours, with the doses ranging from ten to one thousand times the normal lethal dose of unmodified pneumococci, produce good results. A sufficient time is allowed for the injected pneumococci or the toxin produced thereby to incite a production of anti-toxin in the animal body; and then the serum (or plasma) is obtained from the animal in the usual way.

It is this serum which contains the pneumonia anti-toxin, which combats the pneumonia symptoms by neutralizing the toxin from the pneumococci, regardless of the type of the latter.

By injecting this anti-toxin into a person or experimental animal suffering with pneumococcic infection, it is found that there is usually a prompt relief of the pneumonia syndrome. There is a marked and rapid lowering of the temperature, a decided and prompt lowering of the leucocyte count, a relief of delirium when it exists, and a prompt return to a state of general well-being; and this is specific to pneumonia cases, as the anti-toxin is without effect in other types of infection. The serum has all the characteristic physiological reactions of an anti-toxin. Moreover, it is found that it neutralizes the pneumococcus toxin, which has now been isolated and identified by J. C. Olson, of the Lilly Research Laboratories, at Indianapolis, Indiana.

When this serum is injected into rabbits suffering from artificially produced respiratory pneumonia it produces complete relief in the majority of the cases, while control cases show a mortality of between 70% and 100%.

Pathological investigations of the tissues in autopsies on experimental animals which have been thus treated and then killed show clearly that the action of the serum counteracts the infection and is anti-toxic in character.

The injection of the serum is desirably intravenous, although it may be subcutaneous or intramuscular. Within a few hours after the injection, the pneumonia syndrome begins to disappear. A single injection is often sufficient to produce permanent relief. In some cases, however, a single injection is not sufficient, for the pneumonia symptoms sometimes recur after about twenty-four hours. When such symptoms do recur, whether once or more, another injection of the serum is indicated; and if given, again produces relief. Rarely are more than two or three injections required.

In the following claims, in defining the material which is treated, and in defining one of the components of the mixture, I use the expression "pneumococci, and/or their products or toxins," to denote either the pneumococci alone, whether living or dead, or the products or toxins alone of said pneumococci, or a mixture of such pneumococci (living or dead) and the products or toxins produced thereby.

I claim as my invention:

1. The process of producing anti-pneumococcic serum, comprising treating pneumococci, and/or their products or toxins with a soluble salt of an organic acid which is a surface-tension depressant; injecting such treated material into an animal; and obtaining blood serum from said animal.

2. The process of producing anti-pneumococcic serum, comprising treating pneumococci, and/or their products or toxins with a surface-tension depressant comprising a soluble salt of a higher fatty acid; injecting such treated material into an animal; and obtaining blood serum from said animal.

3. The process of producing anti-pneumococcic serum, comprising treating pneumococci, and/or their products or toxins with a surface-tension depressant comprising a soluble salt of a higher unsaturated fatty acid; injecting such treated material into an animal; and obtaining blood serum from said animal.

4. The process of producing anti-pneumococcic serum, comprising treating pneumococci, and/or their products or toxins with a surface-tension depressant comprising a soluble salt of a higher fatty acid containing one or more hydroxyl groups; injecting such treated material into an animal; and obtaining blood serum from said animal.

5. The process of producing anti-pneumococcic serum, comprising treating pneumococci, and/or their products or toxins with a surface-tension depressant comprising a soluble salt of a higher unsaturated fatty acid containing one or more hydroxyl groups; injecting such treated material into an animal; and obtaining blood serum from said animal.

6. The process of producing anti-pneumococcic serum, comprising treating pneumococci, and/or their products or toxins with a soluble salt of ricinoleic acid; injecting such treated material into an animal; and obtaining blood serum from said animal.

7. The process of producing anti-pneumococcic serum, comprising treating pneumococci, and/or their products or toxins with castor oil soap; injecting such treated material into an animal; and obtaining blood serum from said animal.

8. An anti-pneumococcic serum obtained from an animal which has received one or more injections of pneumococci, and/or their products or toxins previously treated with a soluble salt of an organic acid which is a surface-tension depressant.

9. An anti-pneumococcic serum obtained from an animal which has received one or more injections of pneumococci, and/or their products or toxins previously treated with a surface-tension depressant comprising a soluble salt of a higher fatty acid.

10. An anti-pneumococcic serum obtained from an animal which has received one or more injections of pneumococci, and/or their products or toxins previously treated with a surface-tension depressant comprising a soluble salt of a higher unsaturated fatty acid.

11. An anti-pneumococcic serum obtained from an animal which has received one or more injections of pneumococci, and/or their products or toxins previously treated with a surface-tension depressant comprising a soluble salt of a higher fatty acid containing one or more hydroxyl groups.

12. An anti-pneumococcic serum obtained from an animal which has received one or more injections of pneumococci, and/or their products or toxins previously treated with a surface-tension depressant comprising a soluble salt of a higher unsaturated fatty acid containing one or more hydroxyl groups.

13. An anti-pneumococcic serum obtained from an animal which has received one or more injections of pneumococci, and/or their products or toxins previously treated with a soluble salt of ricinoleic acid.

14. An anti-pneumococcic serum obtained from an animal which has received one or more injections of pneumococci, and/or their products or toxins previously treated with castor oil soap.

15. An anti-toxin specific to pneumococcic infections, obtained from the blood of an animal that has been injected with pneumococci and/or their products or toxins treated with a surface tension depressant.

16. A composition of matter, comprising a mixture of pneumococci, and/or their products or toxins, and a soluble salt of an organic acid which is a surface-tension depressant.

17. A composition of matter, comprising a mixture of pneumococci, and/or their products or toxins, and a surface-tension depressant comprising a soluble salt of a higher fatty acid.

18. A composition of matter, comprising a mixture of pneumococci, and/or their products or toxins, and a surface-tension depressant comprising a soluble salt of a higher unsaturated fatty acid.

19. A composition of matter, comprising a mixture of pneumococci, and/or their products or toxins, and a surface-tension depressant comprising a soluble salt of a higher fatty acid containing one or more hydroxyl groups.

20. A composition of matter, comprising a mixture of pneumococci, and/or their products or toxins, and a surface-tension depressant comprising a soluble salt of a higher unsaturated fatty acid containing one or more hydroxyl groups.

21. A composition of matter, comprising a mixture of pneumococci, and/or their products or toxins, and a soluble salt of ricinoleic acid.

22. A composition of matter, comprising a mixture of pneumococci, and/or their products or toxins, and castor oil soap.

In witness whereof, I have hereunto set my hand this 24th day of August, 1925.

WINFORD P. LARSON.